United States Patent [19]
Thomerson et al.

[11] 4,273,473
[45] Jun. 16, 1981

[54] SHOCK ABSORBING COLUMN

[75] Inventors: Clarence Thomerson; Jay W. Jackson, both of Corsicana, Tex.

[73] Assignee: Regal Tool & Rubber Co., Inc., Corsicana, Tex.

[21] Appl. No.: 20,163

[22] Filed: Mar. 13, 1979

[51] Int. Cl.³ .................. E02B 3/22; E02B 17/00; B63H 21/04

[52] U.S. Cl. .................. 405/212; 114/219; 405/213

[58] Field of Search .................. 405/211–215, 405/195, 203; 114/219, 220

[56] References Cited

U.S. PATENT DOCUMENTS

| 2,915,879 | 12/1959 | Besse | 405/212 |
|---|---|---|---|
| 2,952,979 | 9/1960 | Rolando | 114/220 X |
| 3,311,081 | 3/1967 | Parker | 114/220 |
| 3,373,713 | 3/1968 | Hindman et al. | 114/220 |
| 3,426,542 | 2/1969 | Hindman et al. | 405/211 |
| 3,564,858 | 2/1971 | Pogonowski | 114/219 X |
| 3,842,779 | 10/1974 | Jaynes | 114/219 X |
| 3,864,922 | 2/1975 | Dial et al. | 114/219 X |
| 3,991,582 | 11/1976 | Waldrop et al. | 114/220 X |
| 3,995,437 | 12/1976 | Drewett | 405/215 |
| 4,005,672 | 2/1977 | Files | 114/219 |
| 4,084,801 | 4/1978 | Landers et al. | 114/219 X |
| 4,098,211 | 7/1978 | Files et al. | 114/219 |
| 4,109,474 | 8/1978 | Files et al. | 114/219 X |

Primary Examiner—Dennis L. Taylor
Attorney, Agent, or Firm—Gerald G. Crutsinger; John F. Booth; Harry C. Post, III

[57] ABSTRACT

A shock absorbing column assembly (10) is provided for attachment to a structural member (12) of an offshore platform. The assembly (10) utilizes a series of shock absorbing elements which cooperate together to absorb shock exerted on the assembly by adjacent vessels. Two shock cells (34) and (36) support the vertical column member (30) in a position spaced away from member (12). Column member (30) is connected to the extending arm of the shock cell by shock absorbing connectors (52) and (54). An outer protector (90) is resiliently connected around the outside of the column (50).

18 Claims, 4 Drawing Figures

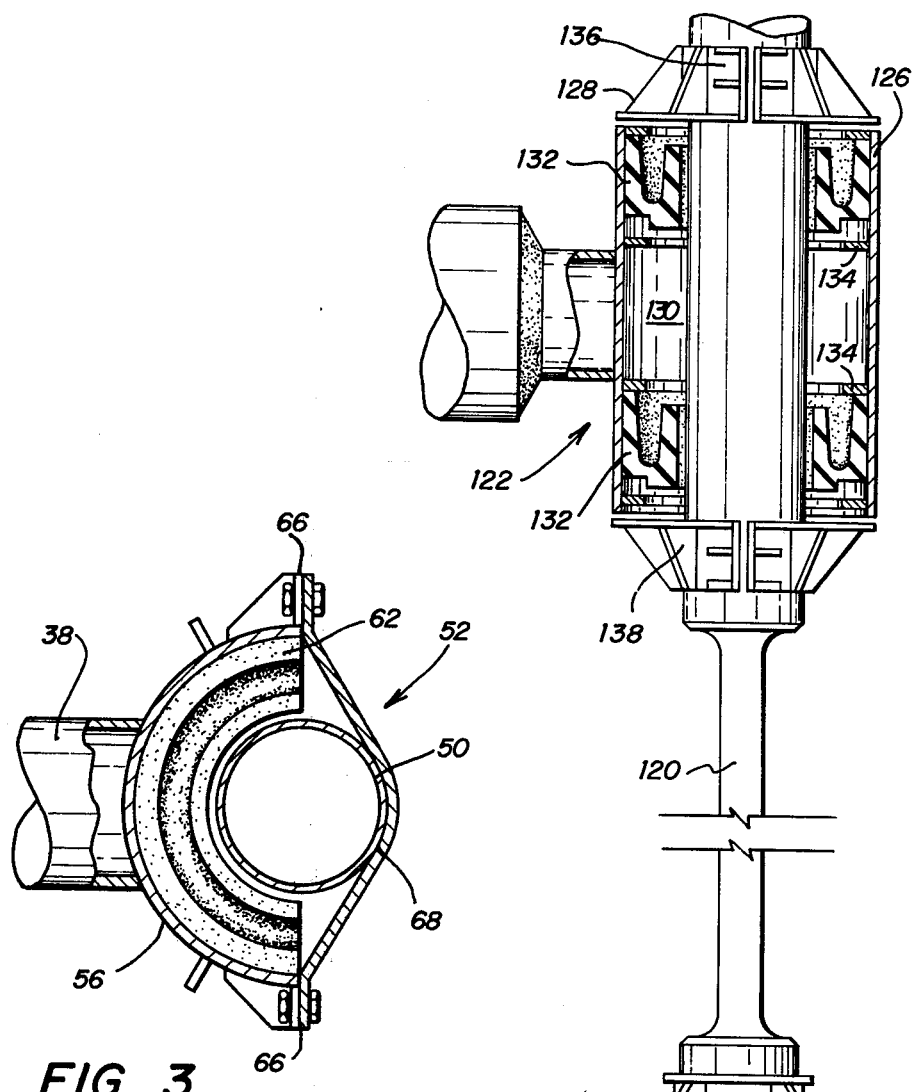
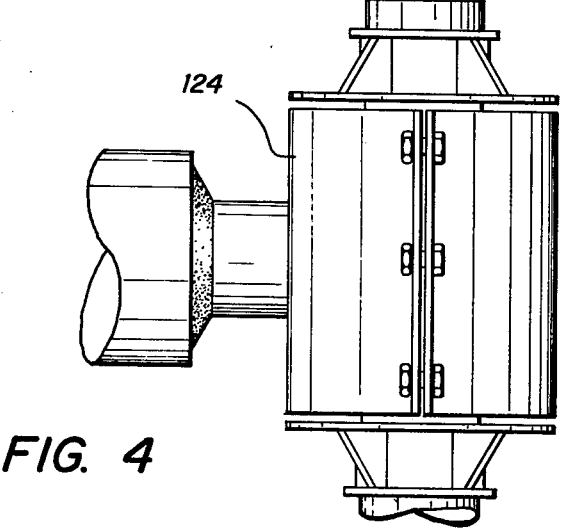
FIG. 3
FIG. 4

SHOCK ABSORBING COLUMN

TECHNICAL FIELD

The present invention relates to the protection of structures from damage from vessels such as boats, barges, and the like and in particular an attachment for offshore platforms which is designed to absorb shock and reduce damage from vessels.

BACKGROUND OF THE INVENTION

In offshore activities, such as the exploration and production of offshore petroleum reserves, it is sometimes necessary to use offshore platforms as a base to perform these activities. Generally these platforms have a portable or fixed structure with vertically extending support legs. To service these offshore platforms, it is necessary to use vessels such as supply boats and barges, and to dock these vessels adjacent to the platforms to offload equipment and supplies. The problem of protecting these offshore structures from damage caused by collision between these vessels and the offshore structures is critical.

To protect these platforms, numerous prior art bumper systems have been designed and used. One protection system is know in the industry as the Lawrence Allison system. This system utilizes rubber tires mounted on a vertical support column positioned next to the platform leg. Some of these systems have the tires exposed and others surround the tires with a protective metal can.

Other prior art systems include the one shown in the United States Patent to Pogonowski U.S. Pat. No. 3,564,858, issued Feb. 23, 1971. This patent discloses boat landing systems for offshore structures in which a frame is supported from the legs of the platform. A spring support is provided on the upper end and on the lower end, a circular snubber or cuff of resilient material is used in a mounting to permit limited movement of the frame both horizontally and arcuately.

Other systems, such as is disclosed in the patent to Files U.S. Pat. No. 4,005,672, issued Feb. 1, 1977, utilize a shock-absorbing element on the upper support. A bottom joint is disclosed formed by a resilient cylinder positioned between two cylindrical members to permit angular displacement at the bottom.

In addition the patent to Files, U.S. Pat. No. 4,109,474, issued Aug. 29, 1978, utilizes a plurality of rubber bumper rings with top and bottom mounted shock cells.

Although these bumper systems have been quite satisfactory in many applications, they have not proved entirely satisfactory where large impact loads must be absorbed to protect the platform. In the previous designs, resilient elements surrounding vertical posts were utilized to absorb energy. When these elements were made of a sufficient toughness to prevent their destruction by contact with vessels, the energy absorbing capacities was substantially diminished, and in some applications, was negligible. Various designs for rings with hollow portions were attempted to return the energy absorbing capacity to these rings. These designs have not proved entirely satisfactory.

DISCLOSURE OF THE INVENTION

A shock absorbing system is provided for protecting the legs of an offshore platform against excessive shock loads. The system has a vertical column which preferably is supported at its upper and lower end by shock cells and is connected to the shock cells through upper and lower shock absorbing connectors. These shock absorbing connectors comprise a resilient member positioned between the column and a retaining surface supported from the shock cell whereby the resilient material is compressed by shock loads applied to the column. In addition, the column can be designed to be flexible to interact with the shock absorbing connectors and the shock cells.

According to one embodiment, a cylindrical outer protector means is positioned around the column and is supported at its upper and lower ends by annular resilient members which are compressed when shock forces are transferred from the outer protector to the column.

BRIEF DESCRIPTION OF THE DRAWINGS

For a complete understanding of the present invention and the advantages thereof, reference is now made to the following description taken on conjunction with the accompanying drawings in which:

FIG. 3 is a sectional view taken on line 3—3 of FIG. 2 looking in the direction of the arrows; and FIG. 4 is an alternative configuration of a shock absorbing column.

DETAILED DESCRIPTION OF THE INVENTION

Figure 1:
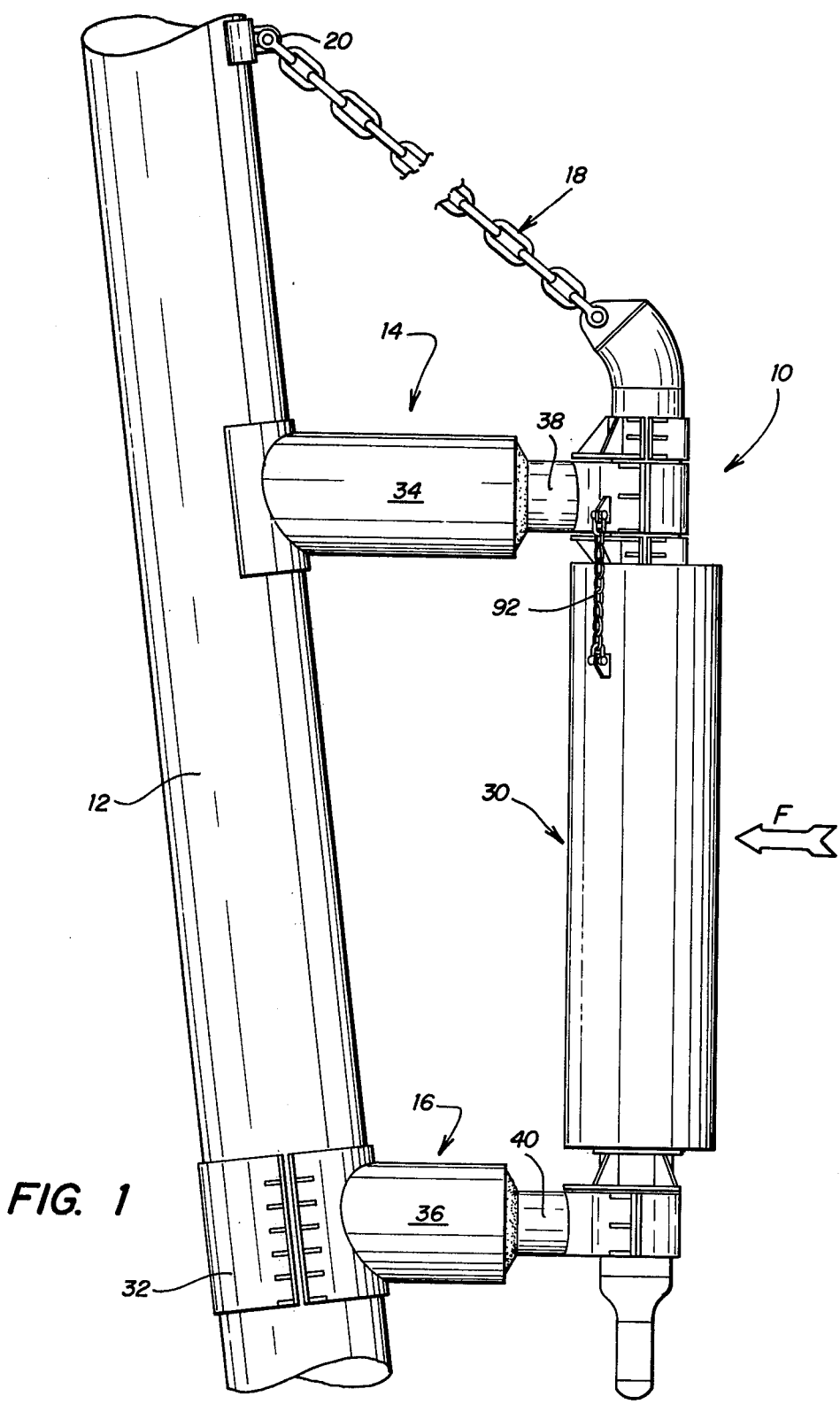
FIG. 1 is a side elevation of the shock absorbing column of the present invention shown attached to a leg of an offshore platform.
Figure 2:
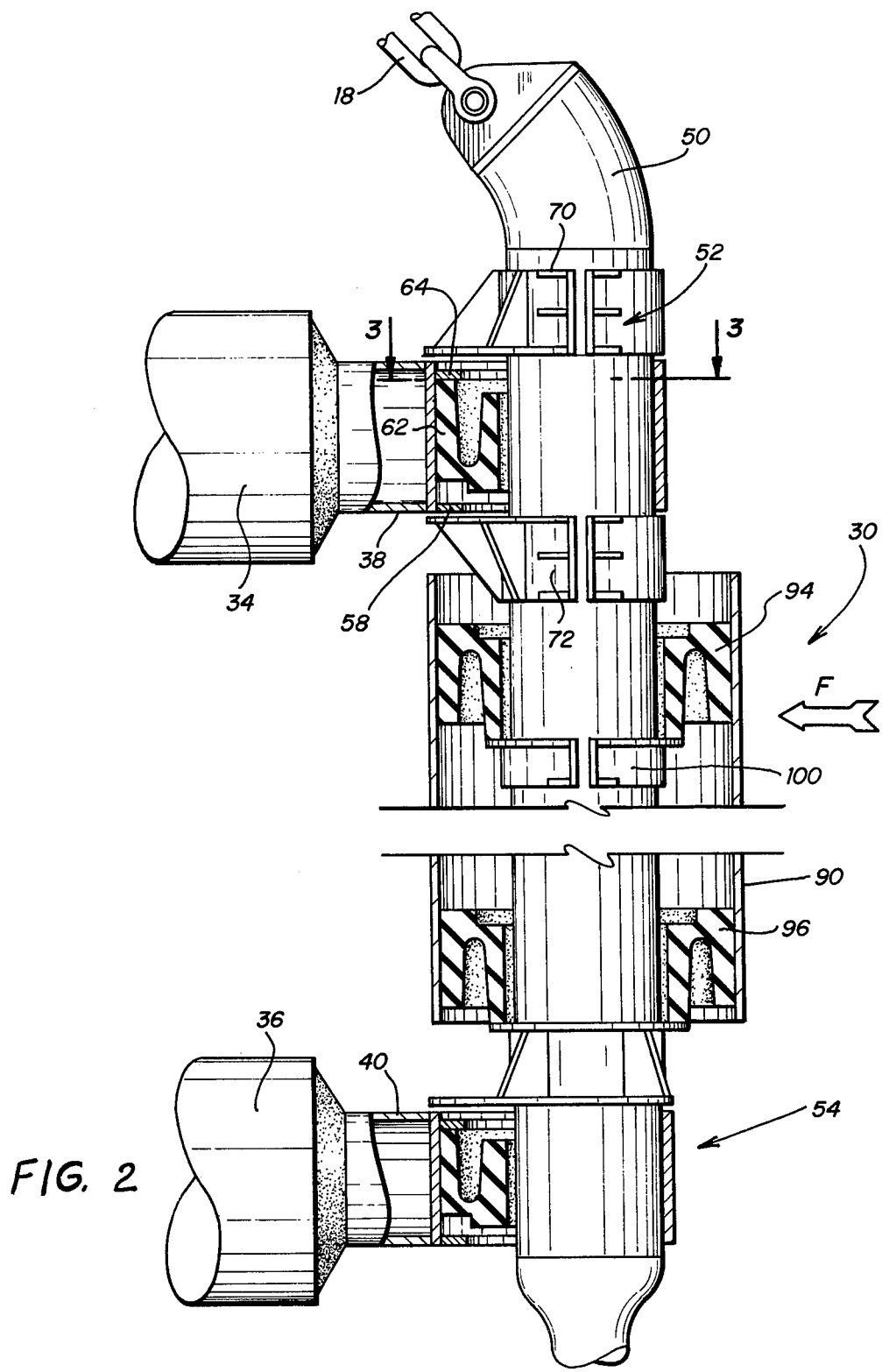
FIG. 2 is a view similar to FIG. 1 showing the shock absorbing column partially in section.

One embodiment of the shock absorbing column of the present invention is illustrated in FIGS. 1-3. In these views, the same reference numerals are used to identify corresponding parts of the system.

In FIG. 1, the shock absorbing column assembly 10 is shown in a typical installation attached to a vertically extending structural member 12. The assembly 10 is shown installed at the water surface level and is positioned to provide protection for the structural member 12 by fending off boats, barges, and other vessels which may, by accident or necessity, come into contact with the structural member 12. In some environments of use, the assembly 10 may be attached to a leg or other structural support of an offshore platform to protect the support against damage from collision or impact from vessels. The assembly can also be used to protect the vessels themselves from damage due to impact with a nonstructural bearing portions of the platform. In addition, it is envisioned that the assembly 10 could be utilized to protect fluid carrying conduit such as stand pipes and the like from damage due to impact from vessels.

Assembly 10 is supported from a member 12 by upper and lower support assemblies 14 and 16, respectively, and an optional tension member assembly 18. The assembly 10 is designed to provide a contact surface spaced away from the member 12 and is provided with means for absorbing the shock imparted to the assembly 10 by vessels contacting the assembly. Thus the assembly reduces the maximum shock loads transferred to the member 12. Accordingly, it is desirable to provide an assembly 10 which absorbs as much energy as possible yet is sturdy and durable enough to withstand enormous impact loads from large vessels such as barges during high seas.

According to the present invention, the shock absorbing column assembly 10 has a vertically extending contact portion 30 which is supported from the upper and lower support assemblies 14 and 16. In the illustrated embodiment, upper assembly 14 has one end connected by welding to member 12, and lower support assembly 16 has a collar 32 bolted around member 12. Both upper and lower assemblies 14 and 16 utilize a shock cell 34.

Shock cells 34 can be of the type described in U.S. Pat. No. 4,005,672 or 4,109,474. It is to be understood, of course, that shock cells could be used other than those shown in the two listed patents. It is important that the shock cells be of the type which provide shock absorption when shock loads applied axially to the arms 38 and 40 extending respectively from the shock cells 34 and 36. The optional tension member assembly 18 is connected to the member 12 at 20 and operates in a manner described in U.S. Pat. No. 4,109,474.

According to a particular feature of the present invention, the contact portion comprises a vertically extending tubular column 50, supported by upper and lower shock absorbing connectors 52 and 54 to the arms 38 and 40, respectively. Upper shock absorbing connector 52 is similar in construction and operation to lower connector 54. For purposes of description, reference will be made only to the upper connector 52 by referring to FIGS. 2 and 3.

A semicylindrical wall 56 is attached by welding to the extending end of the arm 38. A bottom wall 58 extends transverse to the wall 56 and is joined thereto at the lower most edge of the wall 56. Wall 58 has a semicircular portion 60 removed therefrom to form a clearance for the column 50. A semi-annular shock absorbing member 62 rests on the bottom wall 58 and has a semicylindrical peripheral wall which lies adjacent to the inside of the wall 56 as shown in FIG. 3. An internal semicylindrical wall which closely conforms to the exterior of column 50.

The member 62 can be of any suitable resilient material such as rubber, polyurethane, or the like and can be formed from a 180° section of a bumper ring. In the present embodiment the bumper ring is shown as having a rectangular cross section with radially spaced relief holes therein. It is to be understood, of course, that the ring could be similar to ones shown in U.S. Pat. Nos. 4,098,211 and 3,991,582.

An upper wall 64 is attached at the upper edge of the wall 56 and extends parallel to wall 58. The upper wall 64 is identical in shape to bottom wall 58 and has a portion similar to portion 60 removed therefrom to provide clearance for column 50.

Radially extending flanges 66 are formed on wall 56 and are used to releasably attach by suitable fasteners an outer retaining wall 68. Outer retaining wall 68 is bent in the configuration shown in FIG. 3 and serves to limit outward movement of a column 50. Upper and lower mounting brackets 70 and 72 respectively, are releaseably clamped around column 50 above and below the wall 56 to limit vertical movement of the column 50 through the connector 52. In the embodiment illustrated, upper and lower mounting brackets 70 and 72 have split collars which are bolted around the outside of the column 50.

It is to be understood, of course, that the lower shock absorbing connector 54 is constructed in a similar way as the upper connector 52.

According to a particular feature of the present invention, a cylindrical outer protector 90 is positioned concentrically around column member 50 and is positioned vertically between upper and lower support assemblies 14 and 16. In the embodiment shown, the outer protector 90 extends vertically in the area in which contact between vessels and the assembly can occur to receive shock directly on the outer surface of protector 90. Protector 90 is held in vertical position by support chains 92. These chains 92 are positioned on opposite sides of the column 50 and have one end connected to the protector 90 and the other end connected to the exterior of connector 52. As can be seen in FIG. 2, protector 90 is radially separated from column 50 by upper and lower shock rings 94 and 96, respectively. The upper shock ring 94 is held in position and is supported from the column 50 by upper and lower retainers 98 and 100. Lower ring 96 is similarly mounted.

Rings 94 and 96 can be of any suitable resilient material such as the material used for member 62. These rings can be formed in the shape of the bumper rings identified with respect to the member 62.

In operation, when a vessel contacts the outer protector 90 and applies a shock load thereto in the direction of arrow "F" in FIG. 2, a portion of the shock load will be absorbed by compression of shock rings 94 and 96, and a portion will be transferred to the column 50. The portion transferred to column 50 will in turn be partially absorbed by connectors 52 and 54 and shock cells 34 and 36.

According to one embodiment of FIG. 2 of the invention, the shock absorbing characteristics of the shock absorbing elements, i.e., rings 94, 96, connectors 52 and 54, and the shock cells 34 and 36, is related. These elements are related, so that, the maximum force deflection of each element is equal to the maximum force deflection of each of the other elements. For purposes of this application, maximum force deflection is defined as the force required to deform the shock absorbing elements to its maximum operating limit.

In FIG. 4, an alternate embodiment of the invention is illustrated. In this embodiment, a column member 120 is supported from upper and lower support assemblies 122 and 124, respectively. The column 120 is structured of a flexible material which will deform in bending upon impact with a vessel and such deformation providing shock absorption.

The upper and lower connecting assemblies 122 and 124 are identical in construction and are supported by shock cells. The upper support connector 122 is formed from two semi-cylindrical sections 126 and 128 which are bolted together by flanges and define an annular chamber 130 therein. Two spaced shock absorbing rings 132 are positioned in the annular chamber 130. Rings 132 can be of a construction identical to rings 94 and 96 described herein.

Each ring 132 is held in vertical position between spaced parallel semi-annular walls 134. These walls extend internally from the sections 126 and 128. Upper and lower mounting brackets 136 and 138 are provided to maintain the column 122 in vertical position.

In operation, the embodiment of FIG. 4 will absorb shock through deflection of the column 120, compression of the rings 132, and the compression of the shock cells.

According to one embodiment of FIG. 4, the maximum force deflection of the column 122 is equal to two times the sum of the maximum force deflection of the two rings 132 and is equal to two times the maximum force deflection of the shock cell.

In summary, the present shock absorbing column provides an apparatus for attachment to offshore platforms and provides a series of shock absorbing elements whose combined effect allows the use of durable components having substantial shock absorbing characteristics.

Although two embodiments of the present invention have been illustrated in the accompanying drawings and described in the foregoing detailed description, it will be understood that the invention is not limited to the embodiments disclosed, but is capable of numerous rearrangements, modifications, and substitutions within the scope of the invention as defined by the amended claims.

We claim:

1. In a bumper assembly for use on an offshore structure to provide protection from contact from vessels, said assembly comprising in combination:
   (a) a vertically extending elongate contact member having hollow portions adjacent the ends thereof;
   (b) at least one support member extending into each of said hollow portions;
   (c) at least two axially spaced resilient means coupling said contact member to said support member, one of said resilient means being positioned within each of said hollow portions of said contact member, said resilient means being axially spaced to provide an unsupported length of said contact member between said resilient means;
   (d) upper and lower support arms connected to said support member at spaced locations; and
   (e) means for attaching said support arms to said structure.

2. A bumper assembly of claim 1 wherein said means attaching said support arms to said structural member comprises a pair of axially operable shock cells with one end coupled to said structural member and the other end coupled to said support arm.

3. A bumper assembly as defined in claim 1 wherein said resilient means comprise resilient rings which are mounted adjacent the ends of said contact member to provide an unsupported length of said contact member between said resilient rings.

4. The bumper assembly of claim 1 wherein said resilient means comprises upper and lower annular resilient members which are positioned between said contact member and said support member.

5. A bumper assembly of claim 1 additionally comprising said at least two resilient means each being positioned adjacent one of the ends of said contact member.

6. A bumper assembly as defined in claim 1 additionally comprising said at least two resilient means each being positioned adjacent one of said support arms.

7. In a bumper assembly for use on an offshore structure to provide protection from contact from vessels to said structure, said assembly comprising in combination:
   (a) a vertically extending hollow contact member;
   (b) a support member extending through said contact member;
   (c) at least two axially spaced resilient means coupling said contact member to said support member to provide an unsupported length of said contact member between said resilient means;
   (d) upper and lower support arms connected to said support member at spaced locations; and
   (e) means for attaching said support arms to said structure whereby said at least resilient means absorbs shocks applied to said contact member.

8. A bumper assembly of claim 7 wherein said means for attaching said support arms to said structural member comprise a pair of axially operable shock cells with one end coupled to said structure and the other end coupled to said support arm.

9. A bumper assembly as defined in claim 7 wherein said at least two resilient means comprise resilient rings mounted adjacent the ends of said contact member to provide an unsupported length of said contact member between said resilient rings.

10. The bumper assembly of claim 7 wherein said at least two resilient means comprises upper and lower annular resilient members which are positioned between said contact member and said support member.

11. A bumper assembly of claim 7 additionally comprising said at least two resilient means each being positioned adjacent one of the ends of said contact member.

12. A bumper assembly as defined in claim 7 additionally comprising said at least two resilient means each being positioned adjacent one of said support arms.

13. In a bumper assembly for use on an offshore structure to provide protection from contact from vessels to said structure, said assembly comprising in combination:
   (a) a vertically extending hollow contact member;
   (b) a support member extending into each end said contact member;
   (c) at least two axially spaced resilient means coupling said contact member to said support member to provide an unsupported length of said contact member between said resilient means;
   (d) upper and lower support arms connected to said support member at space locations; and
   (e) means for attaching said support arms to said structure whereby said at least two resilient means absorb shocks applied to said contact member.

14. A bumper assembly of claim 13 wherein said means for attaching said support arms to said structural member comprise a pair of axially operable shock cells with one end coupled to said structure and the other end coupled to said support arm.

15. A bumper assembly as defined in claim 13 wherein said at least two resilient means comprise resilient rings mounted adjacent the ends of said contact member to provide an unsupported length of said contact member between said resilient rings.

16. The bumper assembly of claim 13 wherein said first resilient means comprises upper and lower annular resilient members which are positioned between said contact member and said support member.

17. A bumper assembly of claim 13 additionally comprising said at least two resilient means each being positioned adjacent one of the ends of said contact member.

18. A bumper assembly as defined in claim 13 additionally comprising said at least two resilient means each being positioned adjacent one of said support arms.

* * * * *